United States Patent

[11] 3,611,316

[72] Inventor Luther J. Woodrum
Poughkeepsie, N.Y.

[21] Appl. No. 887,979
[22] Filed Dec. 24, 1969
[45] Patented Oct. 5, 1971
[73] Assignee International Business Machines Corporation
Armonk, N.Y.

[54] INDIRECT INDEXED SEARCHING AND SORTING

12 Claims, 8 Drawing Figs.

[52] U.S. Cl. .......... 340/172.5
[51] Int. Cl. .......... G06f 7/22
[50] Field of Search .......... 340/172.5

[56] References Cited

UNITED STATES PATENTS

| | | | |
|---|---|---|---|
| 3,015,089 | 12/1961 | Armstrong .......... | 340/172.5 |
| 3,311,892 | 3/1967 | O'Connor et al. .......... | 340/172.5 |
| 3,399,383 | 8/1968 | Armstrong .......... | 340/172.5 |

*Primary Examiner*—Gareth D. Shaw
*Assistant Examiner*—R. F. Chapuran
*Attorneys*—Hanifin and Jancin and Bernard M. Goldman

ABSTRACT: A sorting method by insertion among sequenced indexes, involving two levels of address indirection for keys T of data records being sorted. The second level comprises a table containing the addresses A of the keys T. The addresses can be in any arbitrary order in their table, and the data records can be located anywhere reachable by the addresses. However the location of each address entry in table A is indicated by an assigned index. These assigned indexes are placed in a highest-level table S in the order of the keys which they represent. An ordering operation occurs for each new key T by placing its address into any available entry location in table A having a corresponding index. The new key is then compared to each key represented by an index entry in table S obtained by a binary search of the keys T using their order represented in table S. The binary search ends at a particular index when either the new key compares equal to a currently examined key, or when not more than $i$ keys have been compared, where table S contains less than $-1+2^{i+1}$ entries. The new index is inserted into table S after a space is made by moving all entries from the beginning of table S up to and including the particular index, and inserting the new index into the space. More new record keys may then be obtained and inserted in the same way.

(STORAGE MAP OF INDIRECT INDEXED SORTING, JUST BEFORE AN INSERTION)

(STORAGE MAP OF INDIRECT INDEXED SORTING, JUST BEFORE AN INSERTION)

(JUST AFTER AN INSERTION)

INVENTOR
LUTHER J. WOODRUM

BY Bernard M. Goldman
ATTORNEY

FIG. 2 (GENERAL PURPOSE PROCESSING UNIT)
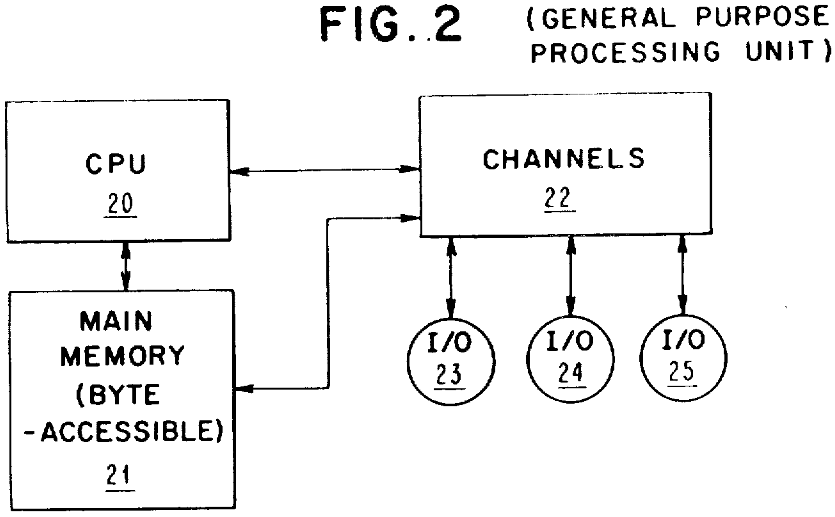
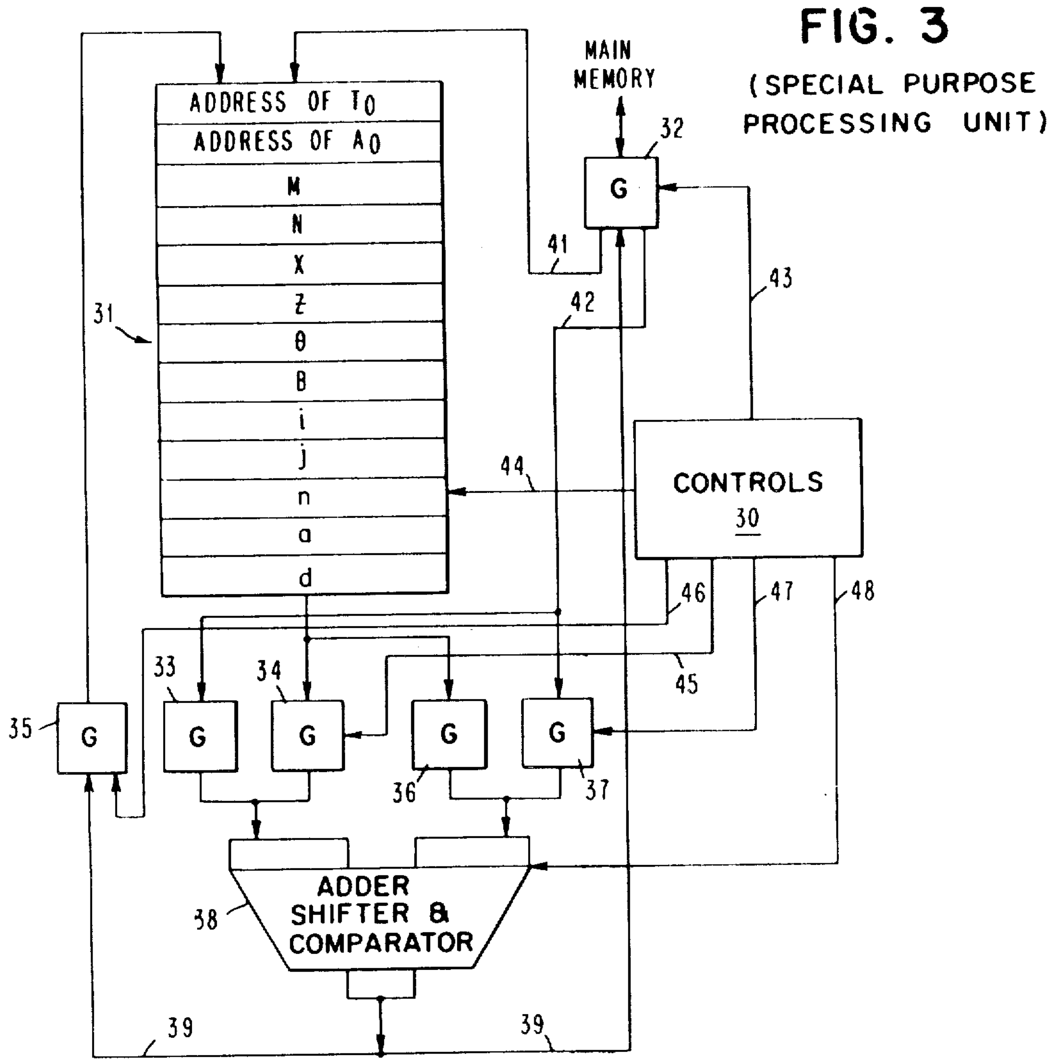
FIG. 3 (SPECIAL PURPOSE PROCESSING UNIT)

INDIRECT INDEXED SEARCHING AND SORTING

This invention relates generally to sorting on a computer system, and relates particularly to an indexed insertion technique using indirect addressing.

In prior art insertion sorting programs, data records have been indirectly sequenced by arranging the addresses of the records into an order which represents the sorted sequence for the keys of the records. In this prior technique, a table of sequenced addresses is generated. The insertion sorting operation sorts each newly received data key by comparing the new key with the keys currently represented by the addresses in the table; a binary search is made of the keys using their order in the address table. The binary search of the address table is preferable to a serial search (also in the prior art), because the binary search is faster due to fewer compare operations being executed. Whenever the binary search is ended, the position for inserting a new key into the address table is found. Then all addresses in the table before the found position are moved by one address location in order to make space for inserting the new record's address into the sequence represented by the address table. If four bytes represent an address, the number of bytes which had to be moved to make space for the insertion is four times the number of addresses to be moved. This prior sorting technique has been publicly used in the IBM-DOS/360 Sort-Merge Program having Program Number 36ON-SM-483.

This prior insertion sorting technique can be used for both internal memory sorting and for an external I/O sorting. It is used internal to the memory in the sense that the sequencing of the addresses in the address table represents an internal sort of the data records represented by the respective addresses. External sorting can be done after each address insertion into the address table, by outputting the first-positioned address in the address table since it represents the lowest record key in the table. The size of the address table is maintained constant by removal of the address for the lowest record after each new address insertion. Each outputted address, or the data record represented by that address, is externally placed in the outputted order on an output device for generating an ascending sort. The same principles are used for a descending sort, except that the table address for the highest record is outputted, which is found at the other end of the address table.

The subject invention provides a novel technique which reduces the number of bytes which need to be moved during insertion sorting compared to the prior art. Therefore the invention enables faster operation for an insertion sorting process under the same data input conditions and with the same CPU speed as might be used with this prior technique.

The subject invention eliminates the need for sequencing addresses in the address table; and instead, the addresses can be arbitrarily positioned in the table in any order. Initially the addresses are preferably positioned in their inputted order which will represent any arbitrary key sequence. After the address table is filled to its capacity, each outputted address (for the lowest key represented in the table) may be found at any location in the address table. It is deleted from the table when outputted, thereby leaving a vacant address location at any position in the address table, instead of only at one end of the table as occurred in the prior sorting technique. With the subject invention, each new address for a new data key being sorted is entered into the address table at the last vacated location, which may be at any location in the address table.

With this invention, the ordered relationship among the keys is represented by an index table which contains sequenced index values for the arbitrary address locations in the address table. Thus each entry in the index table locates a particular address in the address table, which in turn locates a particular record key. Therefore each index table entry represents a particular key; and the index entries are sequenced according to the values of the data keys which they represent. Accordingly in the invention, the index table is the only place representing the addressed key order. The insertion position for a new key is located by a binary search directly using the index table to indirectly obtain the keys needing comparing with the new key. The binary search finds the position in the index table where the index for the new key must be inserted. After the insertion position is found for the new key's index, this position and all prior positions in the table are moved by one index space to make room for insertion of the new key's index. It is during this space making operation that a time saving is obtained by the invention over the prior technique; because the index entries require less space than the addresses which they represent; and hence, fewer bytes need moving for an insertion representing the same key. In computer systems having a single instruction for a multiple byte move, the hardware of the computer systems automatically gains speed as a function of the memory width of the machine. Thus in machines having a memory width of four bytes, four of the one-byte index entries are moved during a single memory cycle using the subject invention; but with the prior technique, only a single four-byte address is moved by a single memory cycle.

Therefore the objects of this invention are to provide:

1. An insertion sorting method and system for data processing machines which reduces the number of byte transfers internal to CPU-memory operations.

2. An insertion sorting method and system for data processing machines using two levels of indirection during a binary search operation.

3. A method and system for data processing machines that needs to move only a one-byte index entry per data record being insertion sorted.

4. A method and system for data processing machines that does not move either data records, or addresses of data records for insertion sorting.

5. An insertion sorting method and system for computer machines which is efficient in making ordered insertions, by minimizing the number of bytes moved for each insertion.

6. A binary search method and system for a computer machine which obtains the minimum average number of compare operations.

The foregoing and other objects features and advantages of the invention will be apparent from the following more particular description of the preferred embodiment of the invention illustrated in the accompanying drawings of which:

FIGS. 1A and B illustrate storage maps for an embodiment of the invention with superimposed information for illustrating operations of the invention.

FIG. 2 is a computer system which can include and execute the method and means of the subject invention.

FIG. 3 is a CPU which can be a special purpose structure devoted to the operation of the subject invention.

Figure 4A:
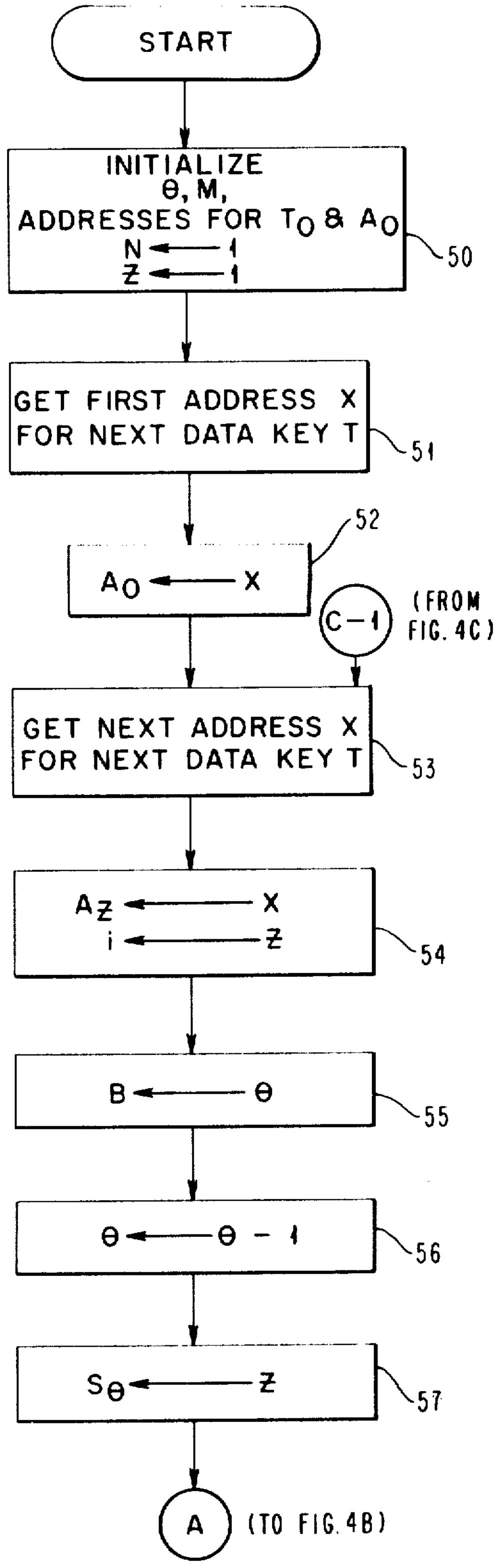

FIGS. 4A, B, and C are flow diagrams representing a method embodiment of the subject invention.

Figure 5:
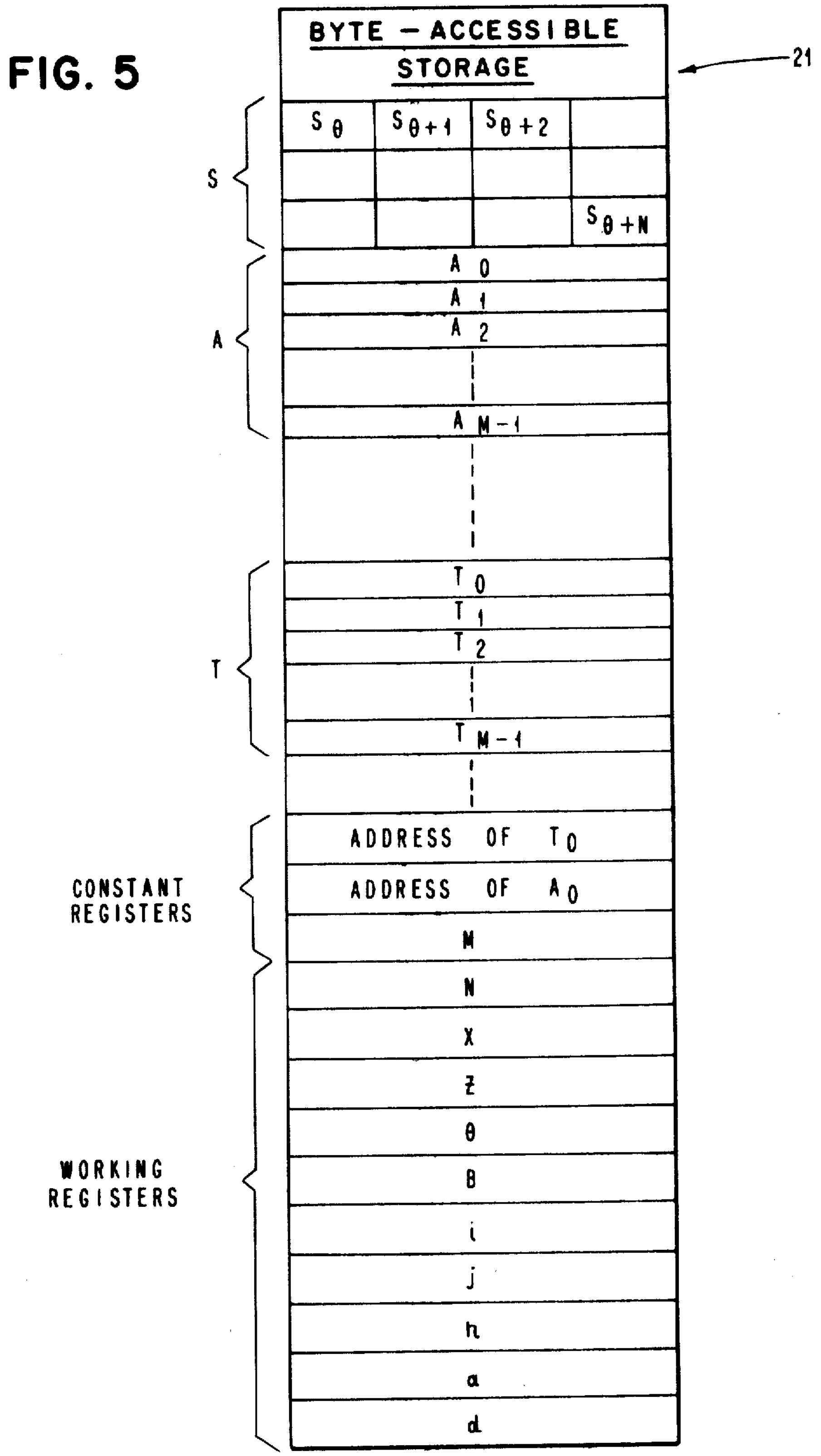

FIG. 5 is a storage map which includes the structure for an embodiment of the subject invention within the main memory of a computer system.

FIG. 1 illustrates the overall technique used in the invention. In FIG. 1 a plurality of data records are provided with key fields which are to be used for sorting these records. The data records may be located anywhere on any I/O device and may be in scattered locations. The locations of their respective data key fields T is the only information which need be known about these records for the purposes of the subject embodiments. Thus in FIG. 1, one data record may have a key field of 0000, another record a key field of 2222, a third record a key field of 0111, and a fourth record a key field of 3333. Each of these data fields have an address which is provided as an entry in table A. The arrangement of addresses in table A is immaterial to the operation of this invention and such addresses can be placed within table A in any convenient manner, such as in whatever order the data addresses are obtained. The arrows from the entries in table A to the data records T are provided to represent any arbitrary sequencing of the data key addresses in table A. Once the entries have been positioned in table A, these entries are locatable therein by an index 0, 1....3. The content of any entry in table A may be designated by "A" with a subscript that represents the index of that entry, for example, "$A_2$" represents the address of the data record having the key field 3333.

The indexes for the address entries in table A are used for sorting purposes in a table S. Any number of data records may be sorted using table S but the greater the number, the higher will be the largest index for table A. If a single byte of 8 bits is used to represent the index for table A, then it can accommodate a maximum of 256 entries in table A for an internal sort.

Table S will also have the same number of entries as table A, which may be up to 256, or a single 8-bit byte used to represent index values.

The sorting operation orders the table A indexes within table S. Thus it is seen that the index entries in table S at its locations $\theta+1$ through $\theta+4$ contain the indexes for the addresses in table A to represent the ordered relationship among the data key fields T for the data records. Thus the content of the one-byte index entry at location $\theta+1$ in table S is 1 to represent address $A_1$ that locates the data key field 0000. In the next location, $\theta+2$ in table S, 3 is found, which is the index for the address $A_3$ in table A which points to the data key 0111. Similarly the next location, $\theta+3$ in table S points to the address $A_0$ which locates data key 2222. The last entry $\theta+4$ in table S, contains the index 2 which locates address $A_2$ in table A which then directly addresses the key field 3333 in the last data record.

Accordingly by indexing and indirect addressing, the order of the entries at $\theta+1 \ldots \theta+4$ in table S represents the data record key sequence 0000, 0111, 2222, 3333.

Assume that a new data entry is to be inserted in the sorting sequence. The address of this new data entry is designated X and is placed at any available location in table A, which, for example, might be the next following location having the index 4, which may be designated Z.

In table S, the initial byte location $\theta$ is used to contain the index Z representing the address of the new data entry in table A. It is then the function of the sorting operation to move the index entry Z from location $\theta$ to an inserted position within the following index entries in table S according to the properly sequenced position of the new data key among the other data keys being sorted.

The insertion sorting operation can use any type of search of table S to determine the ordered position for the index representing a new key. For example, a sequential search, binary search, quadratic search, etc. may be used. In general, the best search is believed to be the binary search, which is the one used in the detailed flow diagram in FIG. 4B.

For example if a new data entry is 2233, the index Z (which is 4 in this example) will be moved within table S to a position between its entries 0 and 2 to become the second last index in the table. This insertion will then be placed at location $\theta+3$, where it will replace the entry 0 which will need to be moved to the adjacent location $\theta+2$, and correspondingly all entries from the beginning of the table to entry $\theta+3$ be moved by one location. This may be done by storing the new entry Z, which in this example is 4, in a register, that will also be called Z, and then moving the entry 1 at location $\theta+1$ into location $\theta$, then moving the entry 3 at location $\theta+2$ into location $\theta+1$, followed by moving the entry 0 from the location $\theta+3$ into location $\theta+2$. This vacates location $\theta+3$ into which the contents of register Z can be placed; and hence its value 4 is stored in the location $\theta+3$ to provide a sequence of table A indexes in table S of 1, 3, 0, 4, and 2, which respectively represent the ordered sequence of data keys 0000, 0111, 2222, 2233, and 3333.

The next new data entry may be handled by having its key address added at the end of table A by incrementing its currently highest index value. Likewise table S can be expanded by decrementing the current value of $\theta$ to provide the next value of $\theta$.

The system described for FIG. 1 may be used for generating a sequence of arbitrary length on an appropriate output storage medium, such as core memory, tape, or disk. An output sequence is produced by outputting the record having the data key field $T_{A_{S_\theta}}$ which is represented by the entry stored in location $\theta$ in table S. Thus the entry at location $\theta$ is used to retrieve its represented address $A_\theta$ in table A, which is then used to obtain the data record key field $T_{A_{S_\theta}}$. When the sorting operation is completed, the sequence represented by entries in table S may be used to output the correct record sequence.

Alternatively, the addresses of the sorted records may be outputted, for example, to a sequential word stream in main memory of the computer system, which later may be used to retrieve a sequenced set of data records. The latter operation is generally faster for a computer system since it permits the CPU processing to continue with minimal I/O interruption. This is particularly useful on a computer system with a scatter read-gather write feature.

FIG. 2 illustrates a CPU system which may be a commercially available digital computer on which this invention may be operated. The computer system includes CPU 20, a main memory 21 which is byte accessible, i.e. any required byte location can be read or written into, one or more channels 22 connected to CPU 20 and main memory 21, and one or more I/O devices 23, 24 and 25 connected to channels 22.

In order to operate the invention in the computer system in FIG. 2, its main memory 21 includes an area which is formatted to provide the registers required for the operation in FIG. 1. Accordingly in FIG. 5 memory areas are allocated for the tables S, A and T. Also in memory 21 areas are provided for initialized registers M, and the registers having the addresses for the beginning of the tables T and A. Furthermore an area in memory 21 is allocated for working registers which are needed for the temporary operations in the processing; the working registers are N, X, Z, $\theta$, B, $y$, $i$, $j$, $n$, $a$ and $d$. The following symbol legend explains the usages of symbols representing the table entries and the register usages.

SYMBOL LEGEND

A = Table of address of data keys
S = Table of one-byte entries
$\theta$ = Address of the first one-byte entry in table S.
T = Data being sorted (may be at arbitrary locations).
$\lfloor \frac{i}{2}$ = Right-shift the contents of register $i$ by one position. The remainder is discarded by being shifted-off.
X = Register receiving the address of each new data key which is to be ordered into the other keys having addresses in table A. $X = A_{S_\theta} = A_Z$.
Z = Register receiving the index assigned to each new key address X. $Z = S_\theta$.
B = Address of the first entry in the current portion of table S remaining to be searched. When $i=0$, B is the insertion address in table S for Z.
$n$ = The number of entries in the current portion of table S remaining to be searched.
M = The maximum number of entries allowed in table A or S.
$i$ = Offset from current B to the next entry to be examined in table S during the binary search.
$j$ = Index used for moving entries in table preparatory for insertion of new entry in its ordered position.
$S_{j+1}$ = Next entry in table S to be moved to $S_j$ during moving operations.
$S_j$ = Current open entry position in table S during moving operation.

REPRESENTATION OF INDIRECT ADDRESSING

Indirect addressing is represented by subscripting. For example: "$S_\theta$" is the content of the entry in table S located at address $\theta$.

"$A_{S_\theta}$" is the content of the entry in table A at a location $S_\theta$.

"$T_{A_{S_\theta}}$" is the content of a data field T at an address $A_{S_\theta}$.

FIGS. 4A, B and C represent a method for handling the tables and registers in FIG. 5 which may be programmed into the general purpose computer system shown in FIG. 2, or be implemented in the controls 30 in FIG. 3. Once a skilled programmer has studied the subject matter in FIGS. 4A, B and C, he will not have any significant difficulty in programming the computer to perform as required herein. Likewise a skilled computer engineer would not have any significant difficulty in implementing controls 30.

FIG. 3 illustrates a special purpose processing unit, which may be tailored in its hardware to perform this invention. In FIG. 3 a local store 31 is provided which includes all of the constant and working registers shown in FIG. 5. The tables are provided in the main memory which is connected to gate 32 in FIG. 3 to provide the quantity stored in main memory to the local store, or other illustrated places, for processing according to the flow diagram shown in FIGS. 4A, B and C. Controls 30 in FIG. 3 include microprogramming either in writable control store or in read only stores (ROS), or AND, OR, INVERT logic circuits implementing the flow diagram in FIG. 4A, B, and C, any of which can be done by a computer engineer skilled in the current art with the knowledge of the subject matter in this specification. For example, gates 32 through 37 are controlled by lines 43 through 48 from controls 30 to generate electrical signals which move the operands specified in FIGS. 4A, B and C in the manner represented therein.

The method shown in FIGS. 4A, B and C generates information which indicates the sorted sequence for data record keys T by using indexing combined with indirect addressing in the manner described for the operations in FIG. 1.

The position of a box represents the sequential relationship of its included operations within the flow diagrams in FIGS. 4A, B and C. However, no sequential relationship exists among plural steps within the box, and they can be done in parallel, or otherwise overlapped.

The process is started in FIG. 4A by entering initialization step 50 in which M, and the addresses for tables T, A and S are set into the designated registers.

The value one is set into the registers N and Z. Then the first address for a data key field T is set into register X which is represented in FIG. 4A by step 51. Next step 52 transfers the contents of register X into the first position in table A, which is identified by the address in the constant register designated "address of $A_0$".

Then step 53 is entered which gets the address for the next data key field T and enters it into register X. Step 54 transfers this current value in register X into location Z in table A which currently is $A_1$ since the initial set value of 1 exists at this time in register Z.

The current value of Z is then loaded into register $i$, and step 55 is entered which sets the current value in register $\theta$ into register B. Step 56 decrements by one the value in register $\theta$, and step 57 loads the current value in register Z into location $\theta$ in table S, which is initially the starting entry in table S.

Figure 4B:
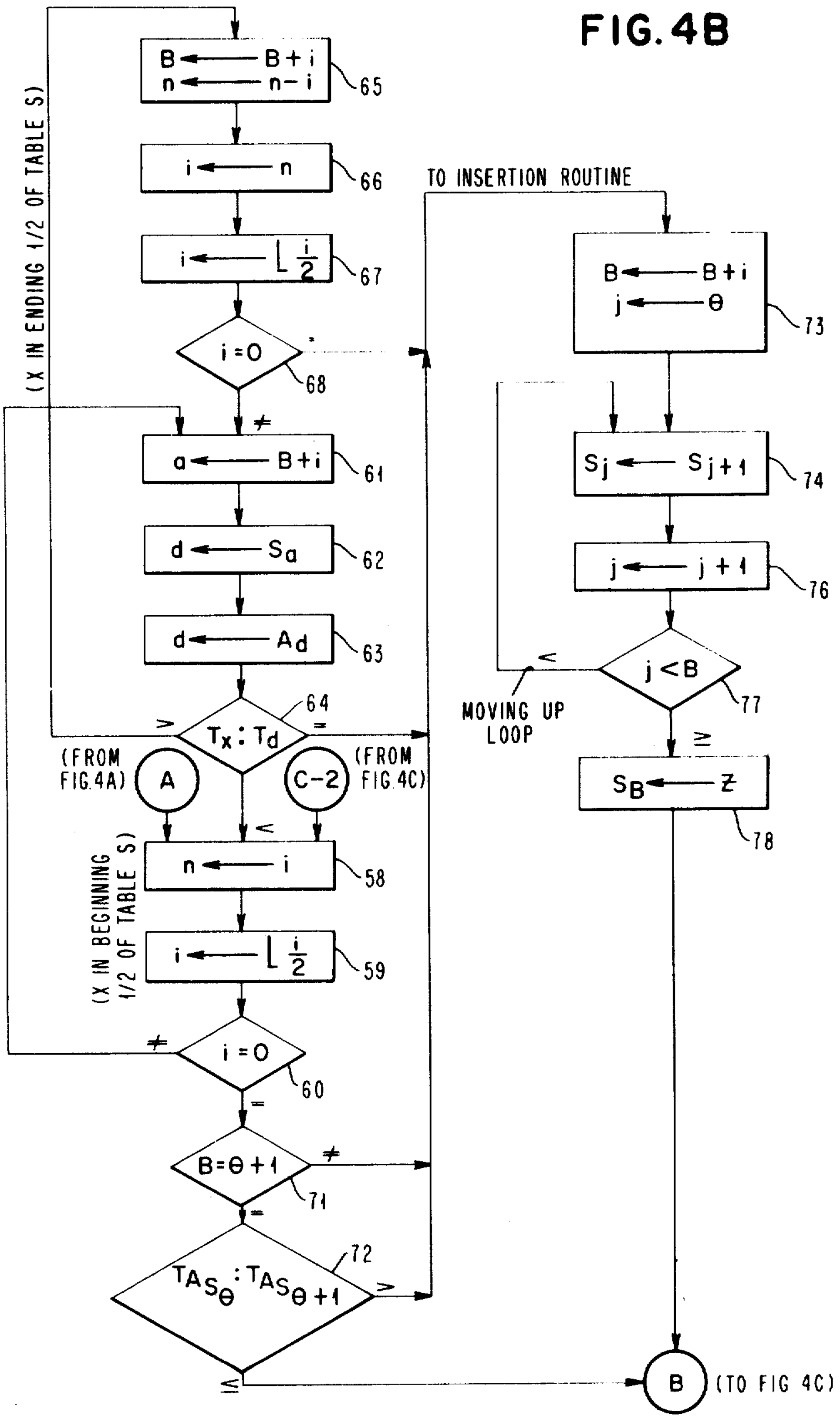

Then an exit A is taken to FIG. 4B, step 58. Step 58 is entered to begin the insertion sorting operation. In step 58, the register $i$ content is transferred to register M, and in step 59 the quantity in register $i$ is right-shifted by one bit-position, thereby losing the rightmost bit position of $i$ existing before the shift. Then step 60 tests whether the current value in register $i$ is zero. This is the first step in a binary search of the table S. The binary search is completed when $i$ becomes zero, or if step 64 finds an equal condition for the search argument with respect to the key represented by the currently examined entry in table S. Initially step 60 finds $i$ is one, and the first shift by step 59 makes $i$ equal to zero. In this case step 71 is entered from which its equal exit is taken since B is equal to $\theta$+1, as neither has changed up to this point. And step 72 is entered which compares the first two keys represented by the two entries now in table A and S. If the represented T value by the index in location $\theta$ is equal to or less than the represented value of T in location $\theta$+1, then exit B is taken to FIG. 4C. However, if the represented T in location $\theta$ is greater than the represented T in location $\theta$+1, then these two entries must be swapped in order to represent their proper sequence in table S. In this case the greater than exit is taken from step 72 to step 73 to swap the two entries at locations $\theta$ and $\theta$+1.

The insertion routine is begun at step 73 which at this point finds $i$ equal to zero in which case B is equal to $\theta$+1. The current value in register $\theta$ is set into register $j$. Step 74 moves the value in location $\theta$+1 into location $\theta$ in table S. Thus $j$ is initially $\theta$, therefore position $\theta$ receives the byte at position $\theta$+1 at this time. Then step 76 increments index $j$ by one which now becomes $\theta$+1, and step 77 compares the current value in register $j$ to the current value in register B. In this case $j$ is equal to B. Hence step 78 is entered which transfers the value in register Z to position $S_B$ which in this case is position $\theta$+1. Then an exit is taken to FIG. 4C.

The index move process can be tailored to the particular computer hardware by moving as many index entries at a time as the memory width of the computer hardware can accommodate. This machine characteristic is automatically accommodated in a computer having a single instruction for moving any number of bytes so as to cause a one-byte shift of data. For example, the MVC instruction in the IBM S/360 series of computers can obtain a one byte shift of any contiguous set of bytes up to 255 on a single execution of the instruction automatically obtaining parallel byte transfers according to the memory width of a particular model. Thus if the memory width for a machine is four bytes, then table S index entries are moved four at a time to increase the byte move speed by a factor of four. Importantly, this eliminates any need for changing the locations of the larger entries in tables A or T during the sorting operation. A speed improvement can also be attained while the indexes in table S are being searched by fetching four indexes at a time.

Figure 4C:
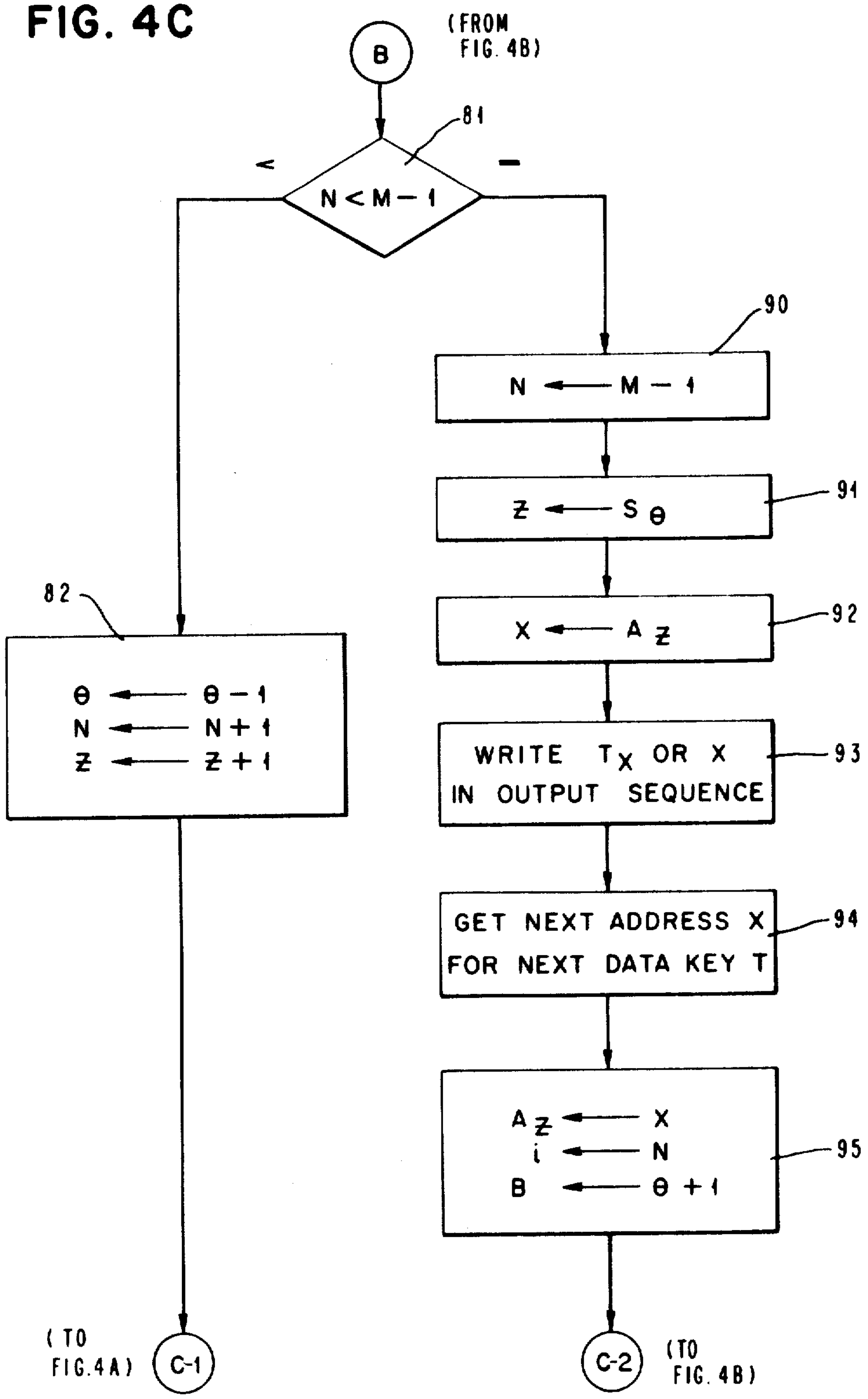

In FIG. 4C, step 82 is entered to determine if the current number of entries N is less than M−1, which is the maximum number that may be entered into table S; it may have a value of 255 using one byte entries of eight bits. At the time of this test, there will be one more entry than the value of N. If M is 256, then N is less than M−1, and step 82 is entered. Step 82 decrements $\theta$ by one to generate the new value of $\theta$ which will be one byte position away from the previous byte position for $\theta$ in table S. Step 82 also increments by one the values in registers N and Z. An exit C−1 is then taken to step 53 in FIG. 4A. Step 53 then obtains the address of the next new data key and puts it into register X. Then step 54 puts the current value in register X into location Z in table A for the new data key address. Step 54 also loads register $i$ with the content of register Z. Step 55 loads the current value in register $\theta$ into register B, and then step 56 decrements the value in $\theta$ by one. Step 57 transfers the address of the next entry in table A from register Z to table S at its location $\theta$.

Then an exit is taken at A to FIG. 4B to step 58, wherein the current value of $i$ is put into register $n$. Then step 59 causes $i$ to be right-shifted by one position to generate a new value of $i$ which will be tested by step 60. In all likelihood, the unequal exit is taken from step 60 to step 61 which results in retrieving approximately the middle entry currently in table S as result of this binary search operation. The steps 61, 62, and 63 are used to obtain retrieval of the data key $T_d$ represented by the entry in S located at B+$i$.

Step 64 compares the key $T_d$ with the key $T_x$ which is the new key to be ordered into the sequence and which is the search argument for the purposes of the current binary search. If this search argument is greater than the value of $T_d$ then the search must go to the upper half of table S by entering step 65. On the other hand, if the search argument is lower than $T_d$, the search will go to the lower half of table S by exiting to step 58. The bottom one-half of table S consists of its entries from location B to, but not including, location B+$i$. The top half of table S consists of its entries from location B+$i$ through B+M−1.

If equality is found between the search argument $T_x$ and the currently key $T_d$, an exit is taken to the insertion routine beginning with step 73.

If the search argument $T_X$ is greater than key $T_d$, then step 65 is entered to determine the new value to be placed in register B, which is the address of the first entry in the current portion of table S remaining to be searched, which in this case is in the top half. The content B is augmented by adding $i$ to it. The value in register $n$ is also readjusted to reflect the decreased number of entries which remain to be searched in table S; accordingly $i$ is subtracted from the last value in register $n$ to generate the new current value, which is placed in register $n$. At step 66 the contents of register $n$ are placed in register $i$.

Step 67 is entered to right shift the contents of register $i$ by one bit-position to generate the new current value in register $i$. The latter operation determines the address in table S which is approximately midway between the remaining entries being searched in the table. Step 68 determines if the contents of register $i$ have been truncated to zero, in which case the binary search is ended, and the insertion routine is entered at step 73. However if $i$ is not zero, steps 61, 62 and 63 entered to generate the location for the key $T_d$, which is retrieved and the search argument compared to it, using step 64, to determine the next operation in the search. Equality will cause exiting to the insertion routine, the greater than condition will cause a repeat of the last described operations beginning with step 65, and a less than condition causes step 58 to be entered, etc., until either $i$ equals zero or $T_X$ is equal to $T_d$.

The equal to or less than exit is taken from step 72 if and only if the new data key is less than or equal to all data keys already ordered.

When the number of entries become full in table S, i.e. M−1 entries (for example, 255 entries) currently exist, step 81 exits to step 90 wherein the lowest represented key will have its address removed from table A and have its index removed from table S to externally generate an ascending sequence. Step 91 posts the content of location $\theta$ into register Z, and step 92 posts the address in table A at its index position Z into register X. For an ascending sort, the sorting operation has determined that the key represented by the current address in register X is the lowest key in the sequence represented by all of the addresses in table A. Step 93 outputs either (1) the address in register X, or, (2) the key $T_X$ as the next key in the output sequence.

The location Z in table A is now vacant and available for use by the next key to be sorted. Therefore step 95 places the address of the next inputted data key, if end of file has not reached, in location Z of Table A. Step 95 also reinitializes registers $i$ and B for the insertion of the new entry. This is done by transferring the content of register N into $i$, and transferring $\theta+1$ into register B. Exit C−2 is then taken to FIG. 4B step 58.

When end of file is reached, all ordered records represented in table S are outputted in order.

The implementation of the operation of the system shown in FIG. 1, 2, 3, 4A and B, and 5 may be assisted by using an index for table A that increments by 4, instead of by one as previously described. If the index increments by 4, the index for table A is also the offset address for the corresponding entries in table A, where each address entry takes 4 bytes. In general, where the entries in table A each require H number of bytes, it is advantageous to use an index increment of H.

The following example illustrates a binary insertion operation where the last key in table T remains to be inserted into the sorted sequence. Accordingly if X is the address of the new key, it is placed in table A at location 4, and its index 4 is placed in entry $\theta$ in table S. The following example of operation occurs:

INSERTION EXAMPLE

Figures 1A, 1B:
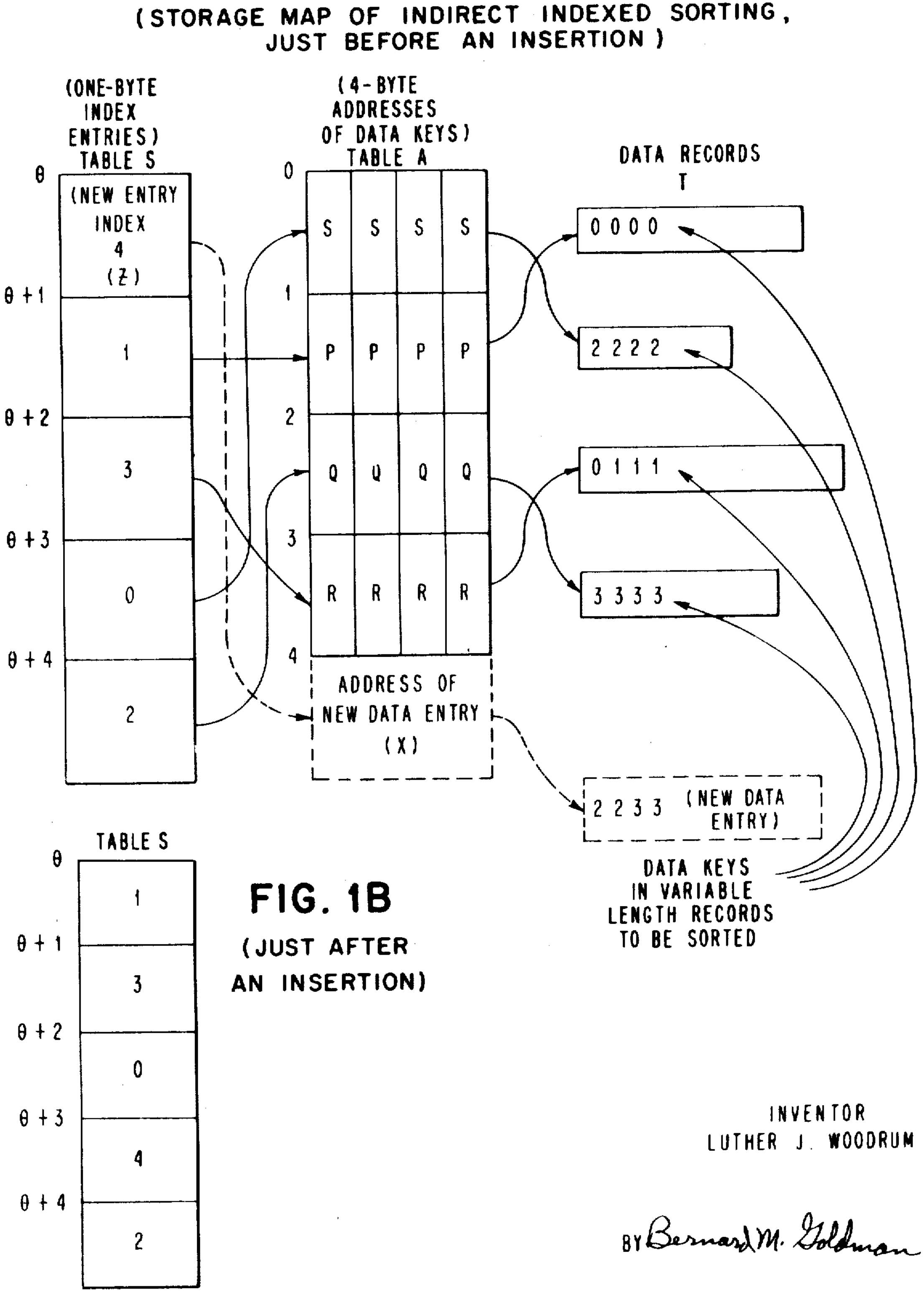

Beginning with step 95 in Figure 4C, with data arranged as shown in Figure 1A:

| | |
|---|---|
| Initialization for search. | $T_X=2233$, $N=4$, and $Z=4$.<br>After step 95 is executed, step 58 in Figure 4B is entered, and the following is done:<br>$A_Z=A_4=X$, $i=N=4$, $B=\theta-1$. |
| First iteration in search loop. | After step 58, $n=i=4$.<br>After step 59, $i=\lfloor \frac{i}{2} = 2$.<br>$i\neq 0$, so step 61 is entered.<br>After step 61, $A=B+i=\theta+1+2=\theta+3$.<br>After step 62, $d=S_a=S_{\theta+3}=0$.<br>After step 63, $d=A_0$=address of "2222" in T.<br>Step 64 compares 2233 to 2222, finds 2233>2222, and exits to step 65.<br>After step 65, $B=B+i=\theta+1+2=\theta+3$, and $n+m-i=4-2=2$.<br>After step 66, $i=2$.<br>After step 67, $i=\lfloor \frac{2}{2} = 1$.<br>Since $i\neq 0$, step 68 exits to step 61. |
| Second and last iteration. | After step 61, $A=B+i=\theta+3+1=\theta+4$.<br>After step 62, $d=S_a=S_{\theta+4}=2$.<br>After step 63, $d$=the address of "3333" in T.<br>Step 64 compares 2233 to 3333, finds 2233<3333, and exits to step 58.<br>After step 58, $M=i=1$.<br>After step 59, $i=\lfloor \frac{1}{2} = 0$.<br>Since $i=0$, step 60 exits to step 71. |
| Test for new entry less than others. | Since $B=\theta+3$, $B\neq\theta+1$, and step 71 exits to step 73. |
| Insertion loop. | After step 73, $B=\theta+3$, and $j=\theta$.<br>After step 74, $S_\theta=S_{\theta+1}=1$.<br>After step 76, $j=\theta+1$.<br>Since $j=\theta+1$, $j<B=\theta+3$, and step 77 exits to step 74.<br>After step 74, $S_{\theta+1}=S_{\theta+2}=3$.<br>After step 76, $j=\theta+2$.<br>Since $j<B$, step 77 exits to step 74.<br>After step 74, $S_{\theta+2}=S_{\theta+3}=0$.<br>After step 76, $j=\theta+3$.<br>Since $j=B=\theta+3$, $j\geq B$, and step 77 exits to step 78.<br>After step 78, $S_B=S_{\theta+3}=Z=4$, and the insertion is complete.<br>Table S appears at this point as shown in Figure 1B. |

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a sorting method, comprising the steps of
   machine-inputting addresses representing keys for machine-readable records being sorted,
   machine-recording said addresses into any assigned location,
   machine-generating indexes for said assigned locations of said addresses, and
   machine-sequencing said indexes in another location according to the order of the keys represented by said indexes through their respectively represented addresses,
   whereby the sequence of said indexes represents the sorted relationship among the keys having addresses in said assigned locations.

2. In an sorting method as defined in claim 1, comprising the steps of
   machine-inputting a new address representing a new key to be sorted into the index sequence currently representing previously sorted keys,
   machine-writing said new address into an available location, and machine-generating an index for the location of said new address, said last-mentioned index representing said new key,
   machine-searching said keys in the order represented by said index sequence to find a position in said index sequence for the index representing said new key,
   machine-moving a current content of all positions in said index after and including said position to make a space for the insertion of the index representing said new key, and
   machine-inserting the index for said new key into said space.

3. In a sorting method as defined in claim 2, in which said machine-searching step comprising the steps of
   binary-searching said keys by directly fetching the index sequence to indirectly retrieve the currently represented keys for comparison with said new key to find the ordered position in said index sequence for said index representing said new key.

4. In a sorting method as defined in claim 2 in which said machine-searching step is a binary search, comprising the steps of machine-storing in a location $i$ a group of binary bits representing the number of index entries in the current index sequence, machine-truncating the lowest bit of said location $i$ to generate a new number in location $i$, machine-testing said location $i$ for zero content, and ending said binary search whenever location $i$ has zero content, machine-retrieving the address at the assigned location having an index represented by the new number in location $i$, machine-providing a current key in a data record represented by the address obtained by said machine-retrieving step, machine-comparing said current key with the new key to signal whether said new key is equal, low, or high.

5. In a sorting method as defined in claim 4, in which said machine-truncating step comprising the steps of machine-transferring the binary content of said location $i$ to a register with said content justified at its low-order end within such register, machine-shifting said content by one bit position in the direction of the low-order end of said register, and machine-loading said location $i$ with the content of said register after said machine-shifting step.

6. In a sorting method as defined in claim 4 including the steps of ending said search if said machine-comparing step signals that said new key is equal to a current key represented in said index sequence, whereby said new key is inserted into said index sequence next to said equal current key.

7. In a sorting method as defined in claim 4 when said machine-comparing step signals said that said new key is lower than said current key, further comprising the steps of again machine-executing the steps defined in claim 4, whereby the binary search ends under the condition defined in claim 4, or under a compare-equal condition.

8. In a sorting method as defined in claim 4 when said machine-comparing step signals that said new key is higher than said current key, comprising the steps of machine-subtracting the content of said location $i$ from the number of remaining entries in said index sequence last searched to derive the current number of entries needing to be searched, machine-loading said current number of entries into said location $i$, machine-adding a beginning address for the last searched portion of said index sequence to the content of said location $i$ to obtain a current beginning address for the portion of said index sequence remaining to be searched, and machine-executing the steps defined in claim 4, whereby the binary search ends under the condition defined in claim 4, or under a compare-equal condition.

9. In a sorting method as defined in claim 4 upon ending said binary search when location $i$ has zero contents, comprising the steps of machine-positioning the index for the new key at the beginning of said index sequence prior to the search of said sequence, machine-signalling when the first index in the current index sequence represents the last current key examined by said machine-comparing step upon ending the search, and machine-indicating that said new key is correctly positioned at the beginning of said index sequence when its represented key is equal to or less than the key represented by said first index in the current index sequence.

10. In a binary-search method for determining the existence, or insertion position, of a search argument in a plurality of machine-accessible data entries, comprising the steps of machine-inputting the addresses of said data entries into machine-accessible positions in any order, machine-assigning position-indexes to said positions containing said addresses, machine-ordering said position-indexes into machine-accessible index entries in an index table, the machine-ordering being in a sequence that represents a sorted relationship among the data entries represented by said index entries, machine-representing a number equal to said plurality of data entries as the binary content of a storage location $i$, machine-shifting said binary content by one position toward the low-order end of said number to generate a location-offset in said index table, machine-testing the content of location $i$ for a zero condition after each execution of said machine-shifting step, machine-ending said binary search if said zero condition is found, machine-comparing the search argument with the data entry represented by an index entry in the index table having the location-offset currently in location $i$, said machine-comparing step signalling a low, equal or high condition for said search argument, and machine-ending the binary search whenever said machine-comparing step signals an equal condition, in which case the search argument is equal to the last data entry compared by said machine-comparing step.

11. In a binary search as defined in claim 10, if said machine-comparing step signals a low condition for said search argument, comprising the steps of machine-storing the content of location $i$ in a temporary location, again machine-shifting the binary content of location $i$ by one position toward its low order end to generate the next location-offset in said index table, again machine-testing the content of location $i$ for a zero condition after each execution of said machine-shifting step, machine-ending said search if said zero condition is found, machine-comparing the search argument with the data entry represented by an index entry in the index table having said next location-offset currently in location $i$, said machine-comparing step signalling a low, equal or high condition for said search argument, and machine-ending the search if said machine-comparing step signals an equal condition.

12. In a binary search as defined in claim 10 if said machine-comparing step signals a high condition for said search argument, comprising the steps of machine-adding the binary content of location $i$ to a beginning address of that portion of the index table last searched to generate the address of the portion of the index table remaining to be searched, machine-subtracting the binary content of location $i$ from a last number of index entries which were searched to generate the number of index entries in the remaining portion of the index table to be searched, machine-loading the result of said machine-subtracting step into said location $i$, again machine-shifting the binary content of location $i$ by one position toward its low order end to generate the next location-offset in said index table, again machine-testing the content of location $i$ for a zero condition after each execution of said machine-shifting step, machine-ending said search without a found condition if said zero condition is found, machine-comparing the search argument with the data entry represented by an index entry in the index table having said next location-offset currently in location $i$, said machine-comparing step signalling a low, equal, or high condition for said search argument, and machine-ending the search if said machine-comparing step signals an equal condition.